United States Patent
Arazi et al.

(10) Patent No.: US 10,006,555 B2
(45) Date of Patent: Jun. 26, 2018

(54) FLUID DISCHARGE VALVE

(71) Applicant: MEKOROT WATER COMPANY LTD., Tel-Aviv (IL)

(72) Inventors: Ilan Arazi, Eilat (IL); Levy Frenkel, D.N Hanegev (IL)

(73) Assignee: MEKOROT WATER COMPANY, LTD., Tel-Aviv (IL)

( * ) Notice: Subject to any disclaimer, the term of this patent is extended or adjusted under 35 U.S.C. 154(b) by 8 days.

(21) Appl. No.: 14/914,077

(22) PCT Filed: Aug. 26, 2014

(86) PCT No.: PCT/IL2014/050764
§ 371 (c)(1),
(2) Date: Feb. 24, 2016

(87) PCT Pub. No.: WO2015/029026
PCT Pub. Date: Mar. 5, 2015

(65) Prior Publication Data
US 2016/0215896 A1    Jul. 28, 2016

Related U.S. Application Data

(60) Provisional application No. 61/869,877, filed on Aug. 26, 2013.

(51) Int. Cl.
*F16K 24/04* (2006.01)
*F16K 31/06* (2006.01)
*F16K 31/10* (2006.01)

(52) U.S. Cl.
CPC ............ *F16K 24/048* (2013.01); *F16K 31/06* (2013.01); *F16K 31/10* (2013.01)

(58) Field of Classification Search
CPC .... B60K 15/03519; B60K 2015/03523; F16K 24/044
(Continued)

(56) References Cited

U.S. PATENT DOCUMENTS 1,689,066 A    10/1928  Baxter
3,334,645 A *   8/1967  Weinstein .......... B01D 19/0063
                                                   137/202
(Continued)

FOREIGN PATENT DOCUMENTS

EP    0854310         7/1998
EP    1801475 A1      6/2007
(Continued)

OTHER PUBLICATIONS

International Search Report and Written Opinion issued in a corresponding application PCT/IL2014/050764 dated Dec. 23, 2014.

*Primary Examiner* — Michael R Reid
*Assistant Examiner* — Patrick Williams
(74) *Attorney, Agent, or Firm* — The Roy Gross Law Firm, LLC; Roy Gross

(57) ABSTRACT

Provided is a fluid flow valve including a housing including a fluid inlet port, and a fluid outlet port including an outlet aperture and a valve seating bounding the outlet aperture; a sealing-member configured to be biased, under fluid pressure within the housing, against the valve seating so as to seal the outlet aperture; a sealing-member displacing mechanism secured to the sealing-member so that displacement of the displacing mechanism in a first sense detaches the sealing-member from the valve seating so as to open the outlet aperture, while displacement of the displacing mechanism in an opposite sense allows for the sealing-member to become sealingly biased against the valve seating; and a sealing-member opening mechanism configured for displacing the sealing-member against the biasing effect of the displacing mechanism so as to discharge the fluid flow valve.

15 Claims, 7 Drawing Sheets

(58) Field of Classification Search
USPC .......................................... 137/202, 216–218
See application file for complete search history.

(56) References Cited

U.S. PATENT DOCUMENTS

| | | | |
|---|---|---|---|
| 3,796,227 A | | 3/1974 | Katsuji |
| 4,011,884 A | * | 3/1977 | Drori .................... F16K 24/042 |
| | | | 137/202 |
| 4,730,638 A | * | 3/1988 | Hazelton ............... F16K 24/048 |
| | | | 137/202 |
| 4,770,201 A | | 9/1988 | Zakai |
| 5,365,970 A | | 11/1994 | Butler |
| 5,957,150 A | * | 9/1999 | Perkins ................. F16K 24/048 |
| | | | 137/202 |
| 6,105,608 A | | 8/2000 | Katzman |
| 6,145,532 A | * | 11/2000 | Tuckey ............ B60K 15/03519 |
| | | | 137/202 |
| 6,149,125 A | * | 11/2000 | Nilsson ................. F16K 15/183 |
| | | | 137/522 |
| 6,513,541 B1 | | 2/2003 | Geoffrey |
| 7,617,838 B2 | | 11/2009 | Katzman et al. |
| 8,479,763 B2 | * | 7/2013 | Hill ...................... B60K 15/035 |
| | | | 123/520 |
| 2010/0168927 A1 | | 7/2010 | Burrows |
| 2010/0217443 A1 | | 8/2010 | Charles |

FOREIGN PATENT DOCUMENTS

| | | |
|---|---|---|
| FR | 1371834 A | 9/1964 |
| GB | 1379844 A | 1/1975 |
| GB | 1435359 | 5/1976 |
| WO | 2012101640 | 8/2012 |

\* cited by examiner

FLUID DISCHARGE VALVE

CROSS-REFERENCE TO RELATED APPLICATIONS

The present application is a U.S. National Phase of PCT/IL2014/050764 filed on Aug. 26, 2014 claiming priority to the U.S. provisional application No. 61/869,877 filed Aug. 26, 2013; the disclosure of the PCT Application is hereby incorporated by reference into the present Application.

TECHNOLOGICAL FIELD

The present disclosed subject matter is generally in the field of fluid flow valves, and more particularly it is concerned with a gas discharge valve configured with a pressure discharge, i.e. a pressure relief valve. The disclosed subject matter is further concerned with flow systems configured with flow valves of the presently disclosed subject matter.

BACKGROUND

A wide variety of fluid discharge valves are known in the art, designed for fitting on different fluid systems and configured for different purposes e.g. pressure control, discharge of residual gas within a liquid in the system, etc.

For example, a gas purge valve is disclosed in U.S. Pat. No. 7,617,838 directed to a gas purge valve comprising a housing formed with an inlet and an outlet formed with a valve seating, and a sealing assembly comprising a sealing member displaceable between an open position and a closed position. The sealing assembly is supported by an external support lever mechanism extending outside the housing, to thereby displace the sealing assembly into sealing engagement with the valve seating at the closed position.

Another example is disclosed in U.S. Pat. No. 6,105,608 directed to a gas purge valve comprising a valve housing that has a valve inlet and major and minor valve outlets, a valve partition mounted in the housing divides the housing into a first chamber communicating with the valve inlet and a second chamber that communicates with the minor valve outlet.

GENERAL DESCRIPTION

The presently disclosed subject matter is directed to a fluid flow valve comprising: a housing configured with a fluid inlet port and a fluid outlet port with an outlet aperture and a valve seating bounding said outlet aperture; a sealing-member configured to be biased, under fluid pressure within the housing, against the valve seating so as to seal the outlet aperture; a sealing-member displacing mechanism being secured to the sealing-member so that displacement of the displacing mechanism in a first sense detaches the sealing-member from the valve seating so as to open the outlet aperture, while displacement of the displacing mechanism in an opposite sense allows for the sealing-member to become sealingly biased against the valve seating; and a sealing-member opening mechanism configured for displacing said sealing-member against the biasing effect of the displacing mechanism, so as to discharge the fluid flow valve.

According to another aspect of the presently disclosed subject matter there is provided a fluid flow system configured with a fluid flow valve of the aforementioned type, wherein the fluid flow system is further configured with an activating unit for selectively manipulating the sealing-member opening mechanism between an open position in which the sealing-member is detached from the valve seating and a closed position in which the sealing-member is sealingly biased against the valve seating.

The activating unit can be configured as a pilot valve being in flow communication with an inlet side of the fluid flow valve, however at the fluid flow valve's vicinity or elsewhere along a flow line being in fluid flow communication therewith. The activating unit can be triggered by a pressure-responsive pilot valve or by a control signal generated by any flow-associated unit articulated directly with the valve and/or fluid flow system.

According to a particular configuration, the fluid flow valve of the presently disclosed subject matter comprises: a housing configured with a fluid inlet port and a fluid outlet port with a fluid outlet aperture configured with a valve seating bounding said outlet aperture; a sealing-member in the form of a flexible sealing-membrane being secured at one end to the housing and is configured to be biased, under fluid pressure within the housing, against the valve seating so as to seal the outlet aperture; and a sealing-membrane displacing mechanism being secured to the sealing-membrane so that displacement of the displacing mechanism in a first sense progressively detaches successive transverse portions of the sealing-membrane from the valve seating so as to open the outlet aperture, while displacement of the displacing mechanism in an opposite sense allows for the sealing-membrane to become sealingly biased against the valve seating; and a sealing-membrane opening mechanism configured for displacing the sealing-membrane into an open position, against the biasing effect of the displacing mechanism, so as to discharge the fluid flow valve.

The fluid flow valve can be composed of an automatic valve component comprising said sealing-member configured to be biased, under fluid pressure to seal the outlet aperture, or the fluid flow valve can be composed as a combined valve comprising the automatic valve component and a kinetic valve component configured with a float unit acting as a kinetic discharge valve.

The term kinetic component (at times also referred to as a gas/vacuum component) as used herein in the specification and claims denotes a component of the valve designed to discharge or admit large volumes of gas during the filling or draining of a pipeline or piping system. This valve will open to relieve negative pressures whenever water column separation occurs.

The term automatic component (at times also referred to as an automatic/gas release component) as used herein in the specification and claims denotes a component of the valve designed to automatically release to the atmosphere small pockets of gas as they accumulate at local high points along a pipeline when the pipeline or piping system is full and operating under pressure.

A combined-type valve assembly operates such that while under pressure, only the automatic component operates, while the kinetic component remains sealed.

The kinetic component comprises a float member axially displaceable within the float chamber and comprising a sealing member configured for sealing engagement with a sealing seat of the outlet port when the float member is urged into a sealing/closed position thereof. Said float member constitutes the sealing-member displacing mechanism of the combined-type valve assembly.

Any one or more of the following features, designs and configurations can be implemented with a valve subject of the presently disclosed subject matter, in single form or in combinations thereof:

The fluid flow valve can be configured with a pilot valve which is configured for generating an operating signal responsive to a predetermined pressure-threshold at the fluid inlet port; the operating signal is then transferred to the sealing-member opening mechanism for displacing said sealing-member. The pilot valve can be associated with the fluid flow valve or with a fluid system to which said fluid flow valve is coupled, in the vicinity of the fluid flow valve or remote therefrom;

The sealing-member is manipulable by the sealing-member opening mechanism between an open position and a closed position (i.e. substantially with no intermediate positions, at an ON/OFF fashion);

The sealing-member is manipulable into its open position for substantially short periods of time;

The sealing-member opening mechanism can be configured for applying force over an external face of the sealing-member;

The sealing-member opening mechanism can be configured as a plunger;

The sealing-member opening mechanism can be hydraulically controlled;

The sealing-member opening mechanism can be configured for applying force at a direction substantially normal to a plane of the sealing-member;

The sealing-member opening mechanism can be configured for applying force near a non-pivoted end of the sealing-member;

The sealing-member opening mechanism can be configured as an add-on unit applied to a fluid valve;

Displacing the sealing-member into its open position substantially does not affect operation of the sealing-member displacing mechanism, which according to some configurations is a float member or a float extension member;

The energy required for displacing the sealing-member into its open position can be fluid pressure residing at a fluid inlet port side of the valve;

The energy required for displacing the sealing-member into its open position can be electric;

A control signal to activate the sealing-member opening mechanism can be hydraulic or electric;

The sealing-member opening mechanism can be configured with a solenoid;

A plunger of the sealing-member opening mechanism can be configured with a section area greater than the section area of the sealing-member, to thereby overcome the resistant pressure applied on the sealing-member within the valve;

The sealing-member opening mechanism can be configured with a slow-release mechanism, to thereby facilitate slow return/closing of the sealing-member, in order to eliminate or substantially reduce shockwaves in the fluid system the valve is articulated to;

The slow-release mechanism can be electronically or hydraulically controlled. For example the slow-release mechanism can be a bleed aperture facilitating fluid discharge back to the line or to the ambience;

The sealing-member can be pivotally articulated to the housing, e.g. in the vicinity of the valve seating, and whereby the sealing-member opening mechanism is configured for pivotal displacement of the sealing-member into its open position, however to an extent wherein the sealing-member does not reach a dead-point ('dead center'), wherein it may fail to return to its closed, sealed position;

The fluid flow valve can be configured for operating at liquid and/or gausses fluids;

The sealing-member opening mechanism can be configured with a magnetic displacing mechanism, wherein the sealing-member is made of or articulated with a magnetically attracted element, and where the displacing mechanism is configured with a magnetic activator (e.g. a fixed magnet or electrically induced) for applying a magnetic manipulating force on the sealing-member;

A pilot valve associated with the fluid flow valve or the system accommodating same, can be fitted at or near the inlet port end of the valve (at an upstream location of a flow system), or the pilot valve can be fitted at other locations, thereby acting as a shock-wave predictor, to thereby prevent or substantially eliminate a shock wave through the fluid system e.g. upon activating or shut down of a pump, etc.; accordingly, a control signal to the sealing-member opening mechanism can be transferred e.g. wireless; and The pilot valve articulated with the sealing-member opening mechanism can be operated by any fluid, i.e. fluid flowing through the fluid system or fluid from an associated reservoir.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Attention is first directed to FIGS. 1 to 4 of the drawings, illustrating a fluid flow valve according to the presently disclosed subject matter, generally designated 10, and configured for coupling to a fluid pipe system (not shown) as known per se.

Figure 6A:
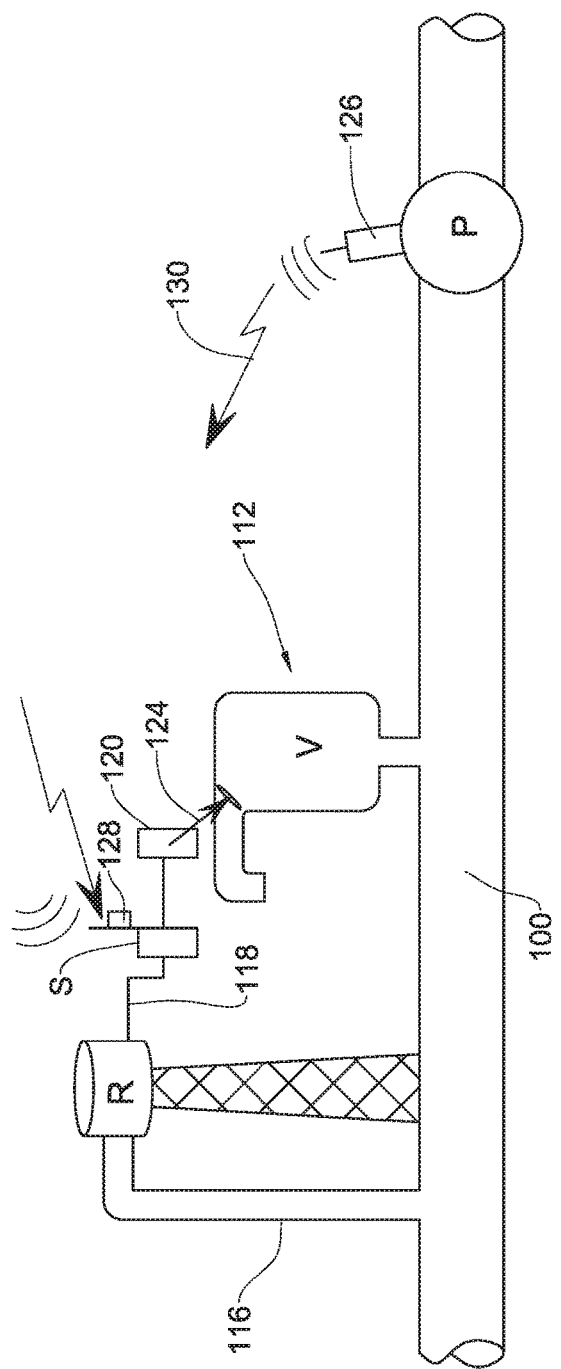
FIGS. 6A and 6B are schematic representations of fluid systems configured with a shock-wave eliminator system articulated with a fluid valve according to the present disclosure.
Figure 6B:
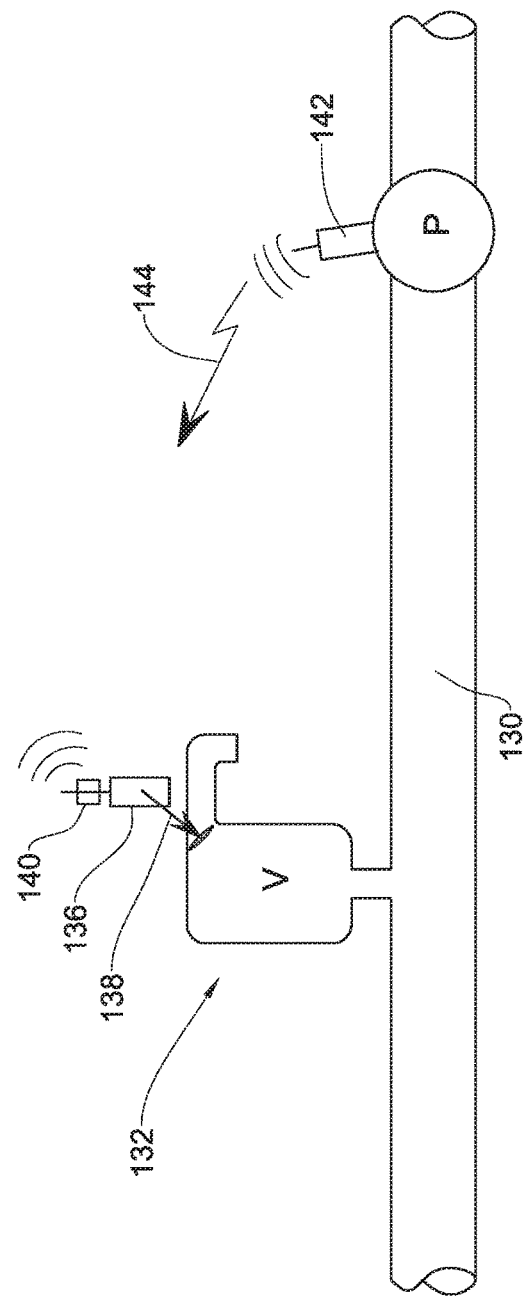

The fluid flow valve 10 comprises a housing 14 composed of a top portion 15A and a bottom portion 15B, screw coupled to one another, and configured with a fluid inlet port 16 (coupleable to a pipe system of a fluid flow system; FIGS. 6A and 6B) and a fluid outlet port 18, optionally with an extender pipe and/or diverter spout articulated thereto (not shown).

A float member 20, constituting a part of a sealing-member displacing mechanism, is received within the housing 14 and is axially displaceable between an uppermost position (FIG. 2) and a lowermost position (FIG. 3), wherein displacement of the float member 20 is restricted to substantial axial displacement, e.g. by virtue of guide ribs or surfaces formed in the housing 10 and respective depressions or formations (e.g. chamfers) extending along the float member 20.

At the outlet end of valve 10 there is configured a major outlet aperture 22 (best seen in FIGS. 3 and 4) and a valve seating 24 integral within the housing 14 and bounding said major outlet aperture 22. A strap-like flexible sealing-member 28 is secured at one end 30 to the housing by a retention member 34 slidingly retained within the housing 10. However, it is appreciated that the strap-like sealing-member 28 can be secured within the housing 10 by other arrangements. A peeling portion 35 of the strap-like sealing-member 28 extends adjacent an opposite end 36 of the sealing-member 28 and is articulated at a top portion of the float member 20. A rigid sealing-member 40 is integral with or integrated with the flexible sealing-member 28 and is shaped and sized for sealing engagement with the major outlet aperture 22. As can further be seen in the drawings, the outlet aperture 22 is configured with a minor, slit-like aperture 44 configured for sealing by the peeling portion 35 of the strap-like sealing-member 28.

Figure 2:
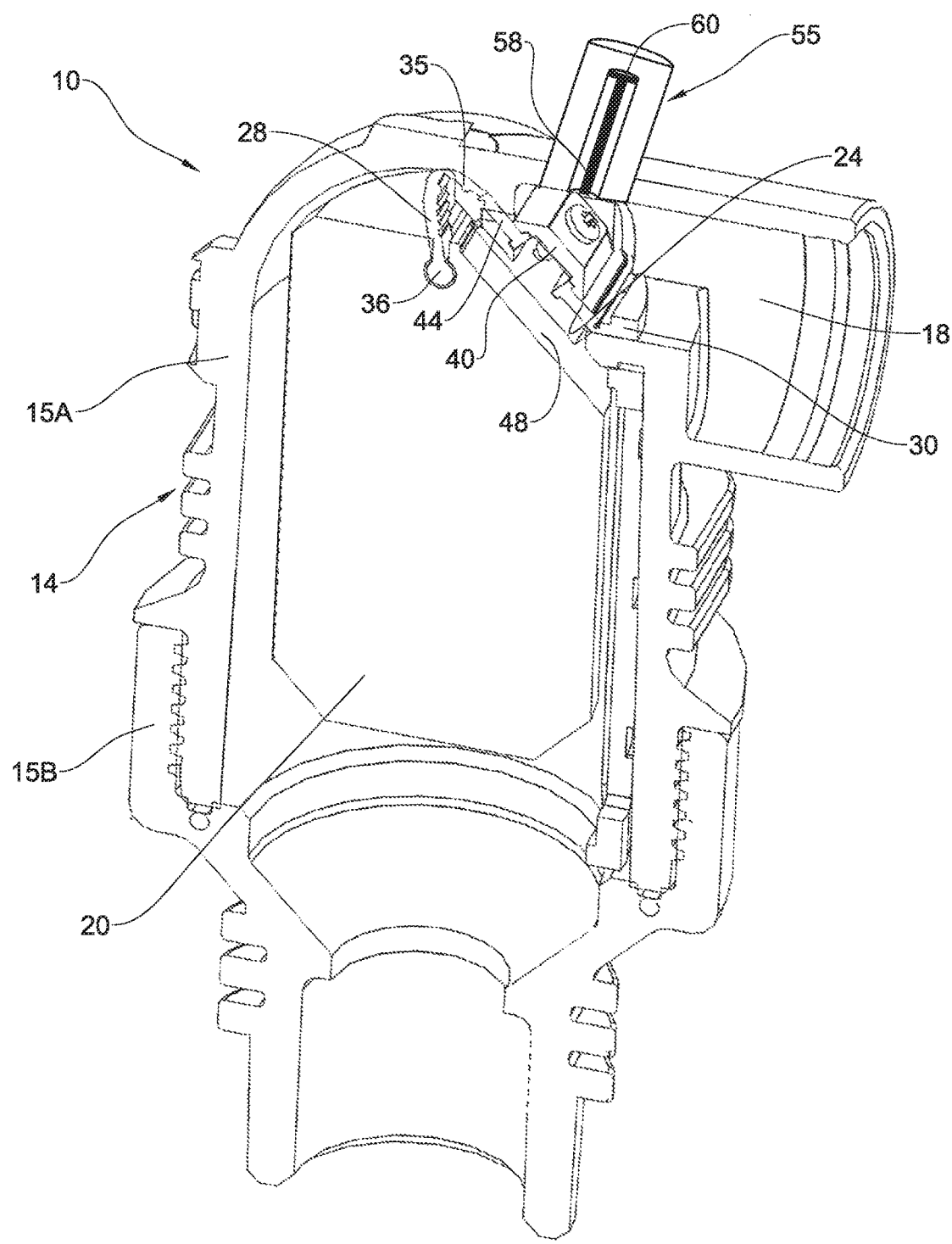
FIG. 2 is a longitudinal section along line A-A in FIG. 1, illustrating the valve at its closed, sealed position.

The arrangement is such that when the float member 20 is urged upwards under buoyancy forces acting thereon at the event of a liquid filling the housing 14 (FIG. 2), it displaces and deforms the sealing-member 28 such that the rigid sealing-member 40 is sealingly engaged with the boundaries of said major outlet aperture 22 and the peeling portion 35 of the sealing-member 28 sealingly bears against the slit-like aperture 44, whereby an inclined surface 48 of the float member 20 bears below against the rigid sealing-member 40 (as shown in FIG. 2), thereby increasing sealing engagement thereof against the boundaries of the major outlet aperture 22.

When, however, gas enters into the housing 14, the float member 20 begins to descend and, in its descent, successive linear sections of the flexible membrane 28 (namely the peeling portion 35), are successively detached from the valve seating, thereby first opening the slit-like outlet aperture 44 for the venting of the gas from the housing 10, and further opening the major outlet aperture 22.

In view of the fact that the force which has to be exerted to detach successive linear transverse portions of the flexible membrane 28 is substantially less than that which has to be exerted so as to open a conventional air discharge valve, the major outlet aperture 22 can be of significantly greater size and in this way the air discharge valve is capable of continuous venting of relatively significant quantities of air. This arrangement is known from U.S. Pat. No. 4,770,201 and reference is made thereto.

As can further be seen in the drawings, the valve 10 is configured at a top portion thereof, with a sealing-member opening mechanism generally designated 55. The sealing-member opening mechanism 55 (e.g. solenoid activated, hydraulic or pneumatic, etc.) is configured in turn with a plunger 58 extending from a solenoid 60. It is however appreciated that the solenoid can be replaced by a hydraulic or pneumatic activator. Alternatively (not shown), the sealing-member opening mechanism 55 can be configured with a magnetic displacing mechanism, wherein the rigid sealing-member 40 is made of or articulated with a magnetically attracted element, and the displacing mechanism is configured with a magnetic activator (e.g. a fixed magnet or electrically induced) for applying a magnetic manipulating force on the sealing-member. Yet an alternative (also not shown) can be implementing a step motor for pivotal displacing the rigid sealing-member 40 between its respective open position and closed position.

Figure 3:
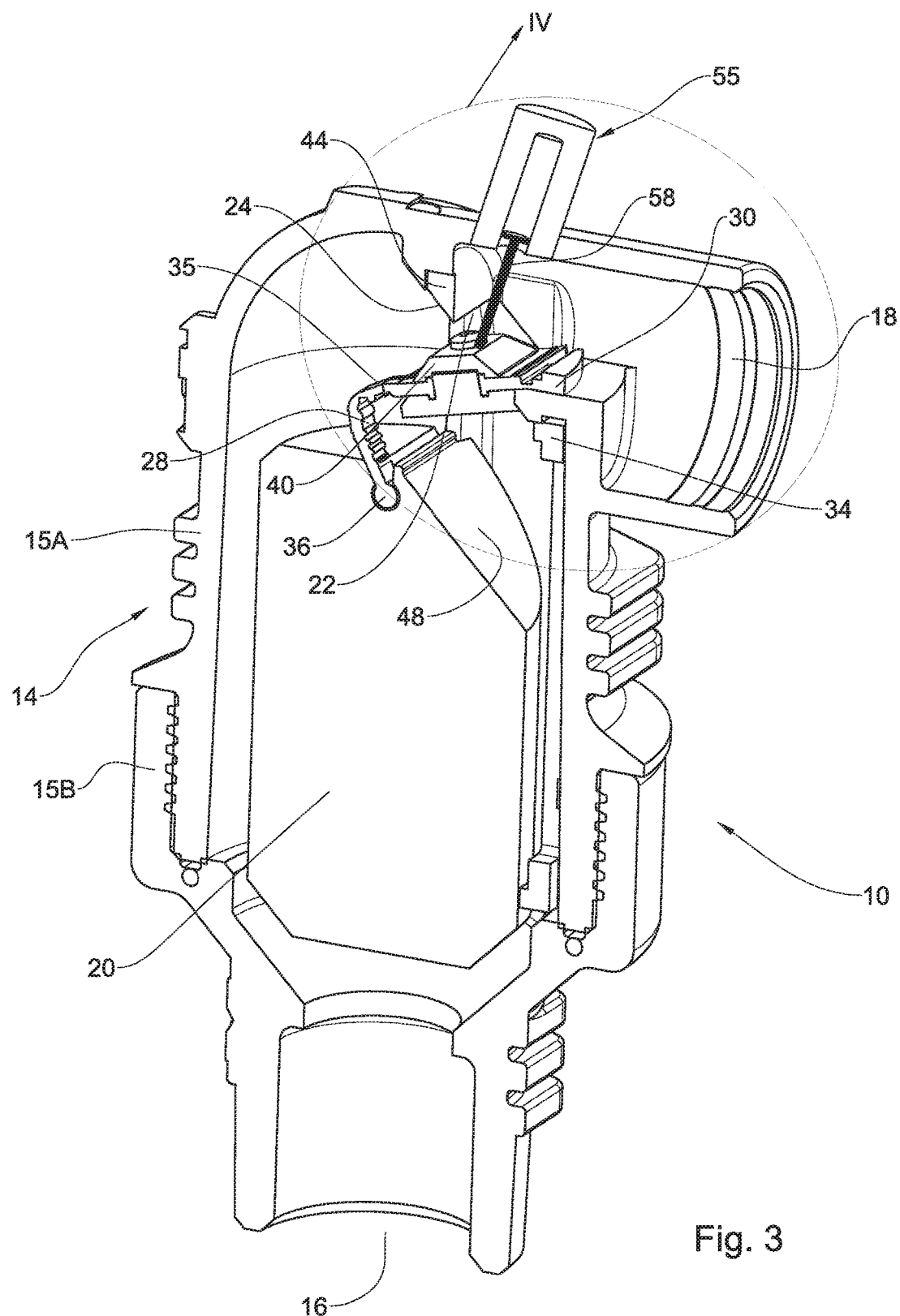
FIG. 3 is a longitudinal section along line A-A in FIG. 1, illustrating the valve with the sealing-membrane temporarily forced into an open position.
Figure 4:
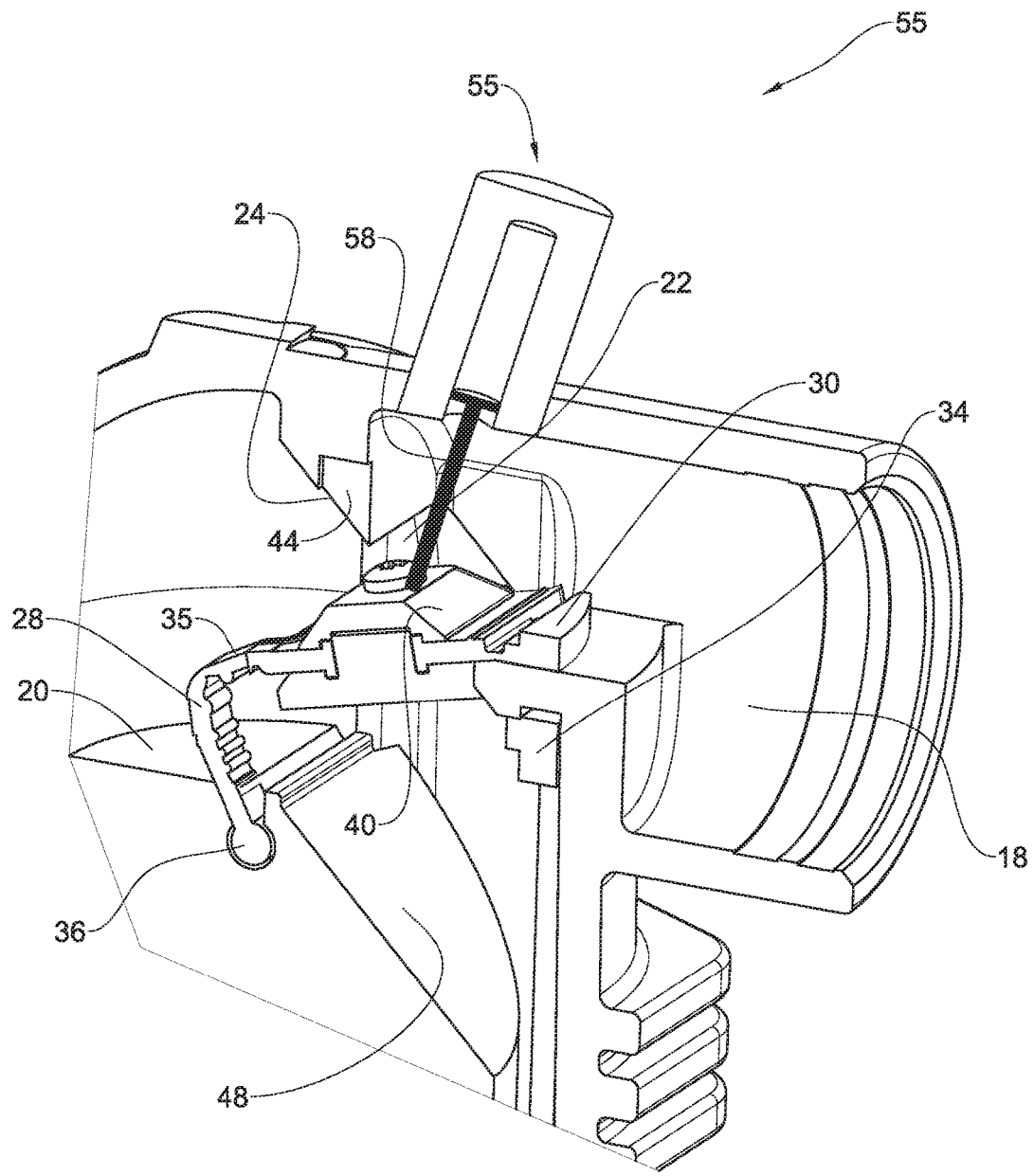
FIG. 4 is an enlargement of the portion marked IV in FIG. 3.

The sealing-member opening mechanism 55 is normally at its retracted position, whereby the plunger 58 is retracted (FIG. 2), i.e. disposed so as not interfering with sealing of the outlet port 18. However, upon initiating the sealing-member opening mechanism 55, e.g. by an electric signal or a hydraulic/pneumatic pulse (depending on the nature of the sealing-member opening mechanism 55, the plunger 58 momentarily projects so as to rapidly displace the flexible sealing-member 28 into its open position, to thereby discharge pressure from the valve 10 (FIGS. 3 and 4). The plunger 58 can be integral with the sealing-member opening mechanism 55 or it can be an extension projecting from the rigid sealing-member 40, either integral with or integrated with any of the above.

It is appreciated that the extent to which the sealing-member 28 is displaced at the open position is so as not to reach a dead-point ('dead center'), wherein it may fail to return to its closed, sealed position. Furthermore, whilst displacement of the sealing member 28 into its open position is facilitated by external force applied thereto by the sealing-member opening mechanism 55, return of the sealing-member 28 to its closed position is facilitated by forces inside the valve, imparted by fluid acting on the float member 20 and urging it into its uppermost position (as soon as the sealing-member opening mechanism 55 has retracted back to its normally retracted position).

It is further appreciated that the sealing-member opening mechanism can be integral with a portion of the housing, or it can be retroactively integrated with the housing.

Figure 5:
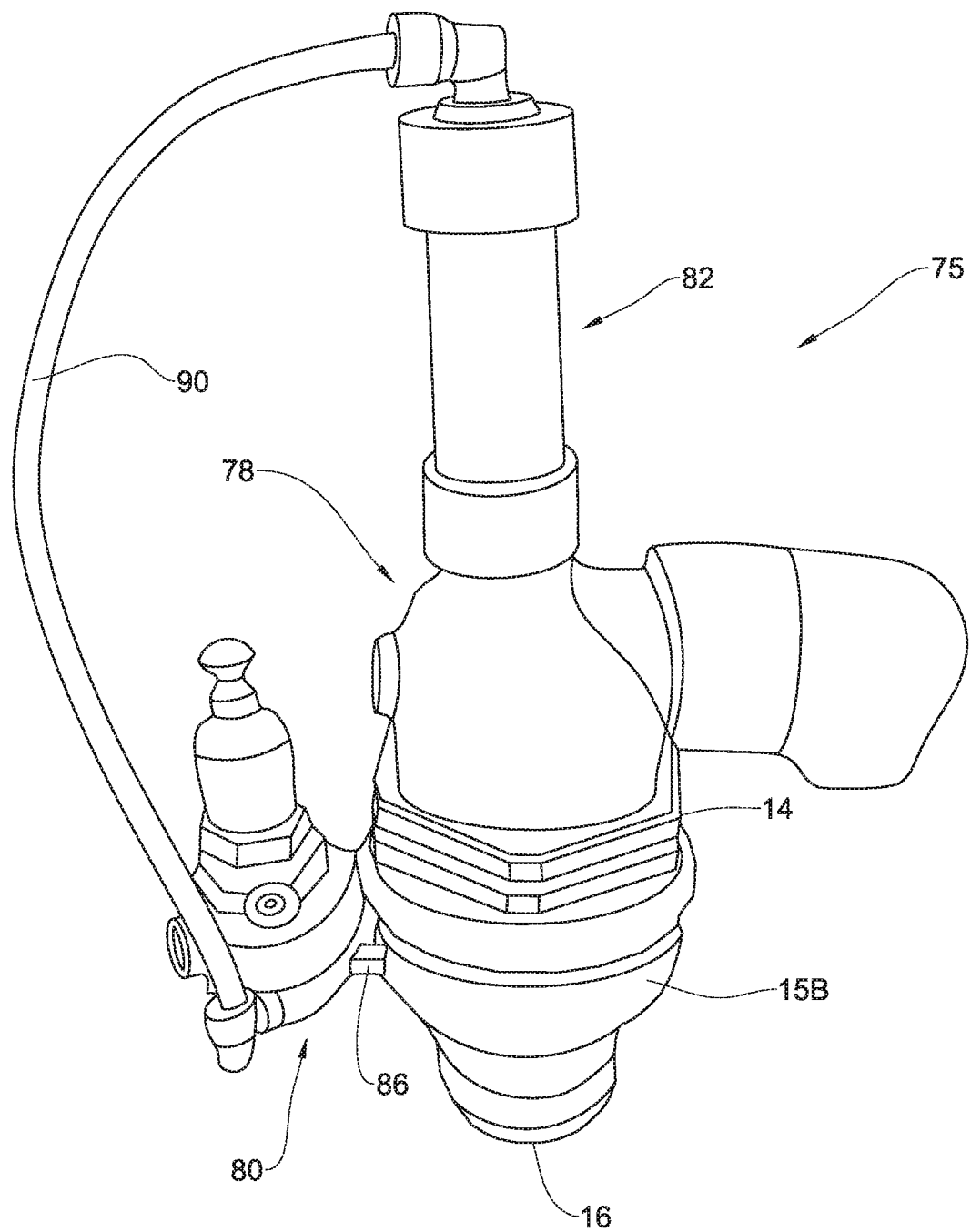
FIG. 5 illustrates a retrofit fluid valve according to an example of the presently disclosed subject matter.

With further reference now being made to FIG. 5 of the drawings, there is illustrated a fluid flow valve system generally designated 75.

The fluid flow valve system 75 comprises a fluid flow valve 78, an activating unit in the form of a pilot valve 80 and a sealing-member opening mechanism 82. In the particular illustrated example, the system is so-called retro-fit, i.e. a fluid flow valve is obtained and manipulated to be articulated with the other components. For that purpose, the bottom portion 15B of the housing 14 is fitted with a pressure port 86 to which the pilot valve 80 is fitted, so as to be in fluid flow coupling with the inlet port end of the valve 78. It is appreciated that the pilot valve 80 can in fact be articulated at other locations in the vicinity of the fluid valve (and being in flow communication with the inlet port thereof), or remote therefrom.

The sealing-member opening mechanism 82 is a hydraulic actuator mounted externally at a top portion of the fluid flow valve 78 and comprising a hydraulic piston (not seen) for urging a plunger (not seen) against the sealing-member within the valve 78, as explained hereinabove in connection with FIGS. 1 to 4.

The pilot valve 80 is in flow communication with the sealing-member opening mechanism 82 through a hydraulic command line 90, whereby upon pressure rise at the inlet port 16 of the housing 14, beyond a predetermined pressure threshold, the pilot valve 80 generates an activating hydraulic signal to the sealing-member opening mechanism 82, resulting in activating the sealing-member opening mechanism 82 to momentarily urge the plunger thereof, whereby the valve is vented as described hereinabove. After discharge of the pressure from the valve 78, the sealing-member will spontaneously displace back to its closed position, under pressure applied from below by the float member, as explained hereinabove.

Figure 1:
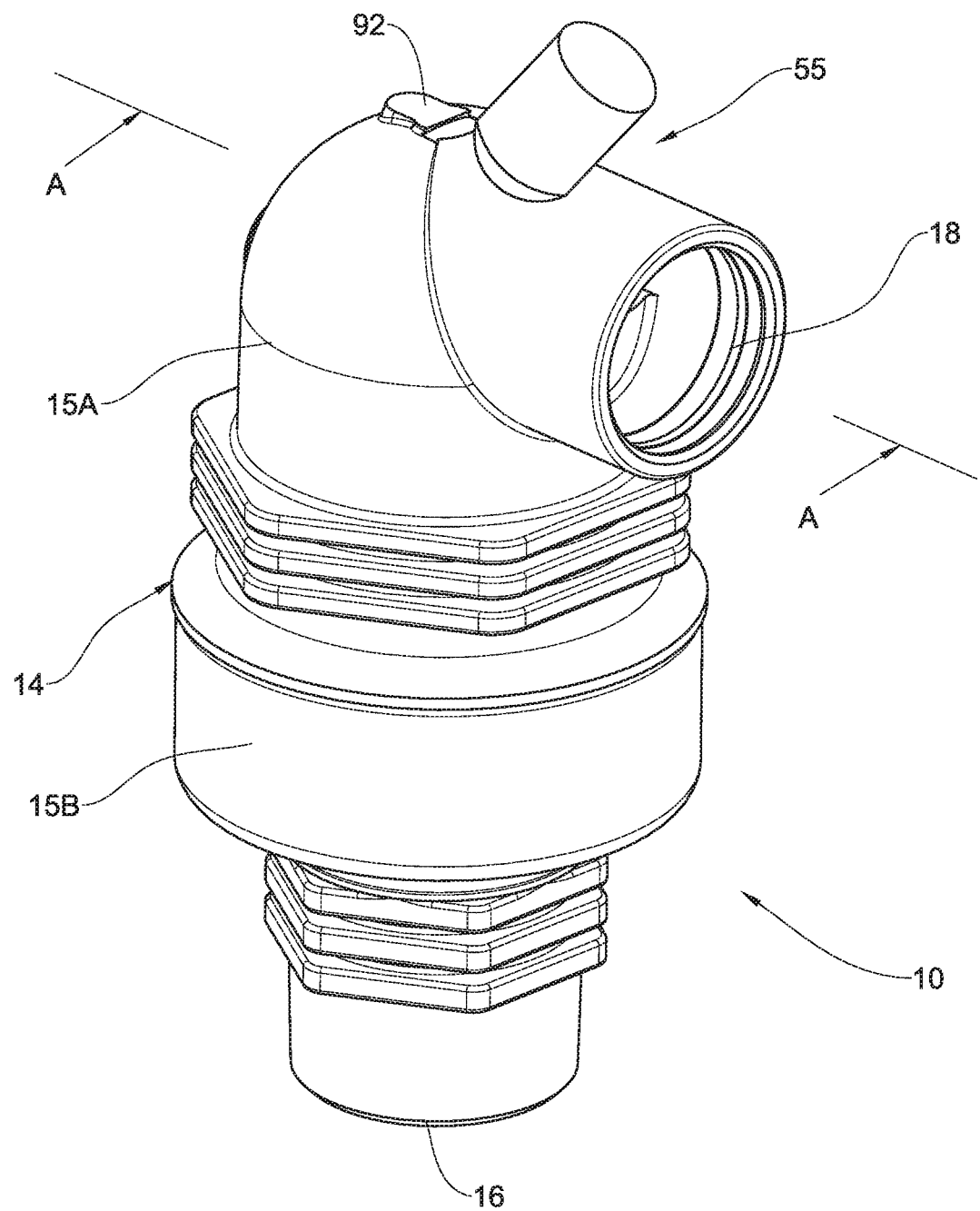
FIG. 1 is an isometric view of a fluid valve according to an example of the presently disclosed subject matter.

It is noted that the fluid valve system illustrated in FIG. 5, comprises a fluid valve 78 of the type seen for example in FIG. 1, wherein the valve 78 is retro-fitted with the pilot valve 80 and the sealing-member opening mechanism 82. This is facilitated by providing coupling locations (e.g. 92 in FIG. 1, and a replaceable bottom portion 15B as in FIG. 5) on the housing 14 of the fluid flow valve 10. Alternatively, the valve housing is a-priori fitted with suitable coupling locations.

Whilst in the particular example of FIG. 5, the pilot valve 80 is fitted at the vicinity of the housing of the valve 78, according to other examples the activating unit can be remote from the fluid flow valve, whereby a signal/pulse to the sealing-member opening mechanism 82 is transferred hydraulically or pneumatically (the former may be at times preferred, as hydraulic pressure is readily available through the fluid system), or electrically (wireless or not). Accordingly however, suitable signal converters can be applied, e.g. for converting a pressure signal to an electric signal, etc. using electric signals is in particular useful since the activating unit can be located remote from the fluid flow valve, and serve for example as a shock predictor, as will be described hereinafter with reference to FIGS. 6A and 6B.

In FIG. 6A there is schematically illustrated a segment flow system comprising a flow line (pipe) 100 fitted in turn with a pump P and a fluid valve system generally designated 112, e.g. of the type disclosed in connection with FIGS. 1 to 4, and reference is made thereto.

The system further comprises a liquid reservoir R holding a liquid received through branching fill pipe 116. An outlet control line 118 extends from the reservoir R and is fitted with a solenoid S or otherwise flow control faucet, and extending towards a sealing-member opening mechanism 120 which in turn is articulated to the valve 112 for opening the sealing-member by means of a plunger or the like, generally designated 124. The pump P is fitted with a wireless transmission unit 126 (though wired transmission can be facilitated as well, or as already discussed hydraulic signals can be transmitted as well), said signal being picked up by a receiver unit 128 of the solenoid S.

The arrangement is such that upon activating or shutdown of the pump P, a signal 130 is generated and transmitted by the wireless transmission unit 126, said signal being received at the receiver unit 128 of the solenoid S, resulting in opening the solenoid such that an amount of liquid flows from the elevated (or pressurized) reservoir R through the outlet control line 118 to the sealing-member opening mechanism 120, resulting in momentarily activating the plunger 124 so as to open the sealing member of the fluid flow valve, resulting in pressure venting of the line 100 and thus reducing or substantially eliminating a shock wave that may otherwise occur through the flow system, and thus reduce potential damage to equipment along the line.

The fluid system schematically illustrated in FIG. 6B is simpler and comprises a flow line (pipe) 130 fitted in turn with a pump P and a fluid valve system generally designated 132, e.g. of the type disclosed in connection with FIGS. 1 to 4, and reference is made thereto.

The fluid valve system 132 is articulated with a solenoid 136 (or other sealing-member opening mechanism as discussed hereinabove) configured with a plunger 138, which in turn is fitted with a wireless signal pickup unit 140. In turn, the pump P is fitted with a wireless transmission unit 142 (though wired transmission can be facilitated as well, or as already discussed hydraulic signals can be transmitted too).

The arrangement is such that upon activating or shutdown of the pump P a signal 144 is generated and transmitted by the wireless transmission unit 142, said signal being received at the receiver unit 140 of the solenoid 136, resulting in activating the plunger 138 of the sealing-member opening mechanism 136, resulting in momentarily opening the sealing member of the fluid flow valve. This results in discharging gas from the line 130 and venting the line 130 and thus reducing or substantially eliminating a shock wave that may otherwise occur through the flow system, and thus reduce potential damage to equipment along the line.

Whilst the examples of FIGS. 6A and 6B make reference to a flow system fitted with a pump P, it is appreciated that a shock wave in a fluid supply line can occur owing to different reasons, such as a sudden opening of a branch in the supply line, a pipe failure and the like, wherein provision of one or more pressure sensing arrangements along the supply line, articulated with a flow valve system according to the currently disclosed subject matter, can reduce potential damage to equipment along the line, by reducing or substantially eliminating a shock wave therethrough.

Figure 7:
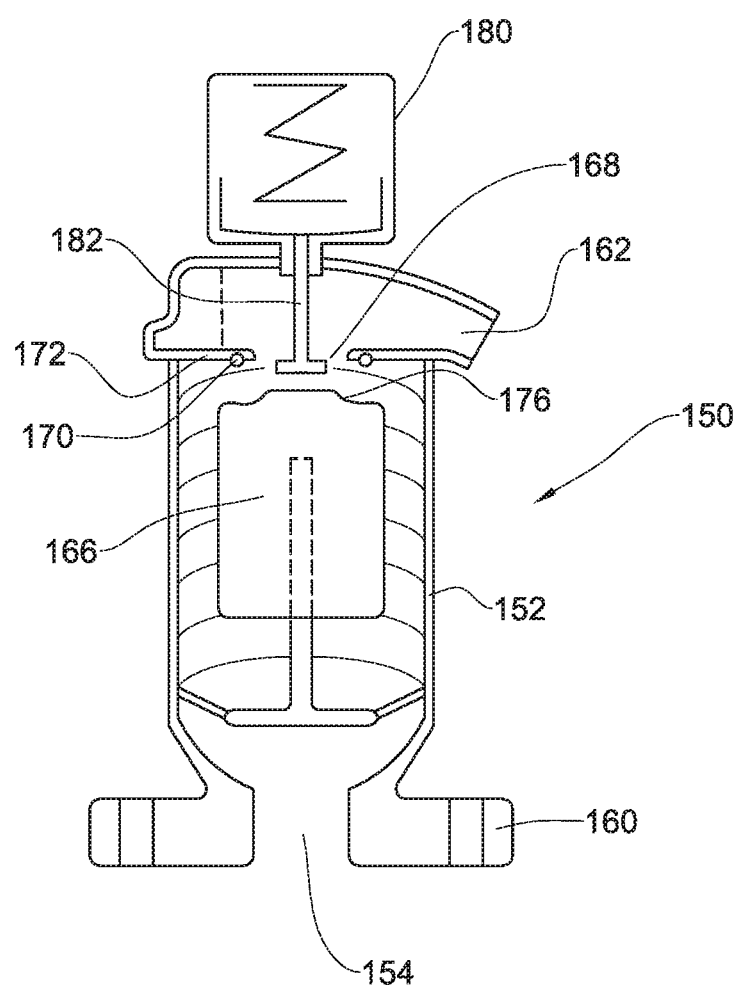
FIG. 7 is a schematic cross-section through an embodiment of valve system of the presently disclosed subject matter.

Further attention is now directed to FIG. 7 of the drawings, schematically illustrating a valve system according to the present disclosure and generally designated 150.

The valve system 150 exemplifies a modification of a valve system according to a different design of the disclosed subject matter, though it functions similar to the arrangements discussed hereinabove.

The fluid flow valve 150 comprises a housing 152 configured with a fluid inlet port 154 coupleable to a pipe system of a fluid flow system through flange 160, and a fluid outlet port 162. A float member 166 is disposed within the housing 152 and is axially displaceable between an uppermost position and a lowermost position (illustrated).

At an outlet end of valve 150 there is configured an outlet aperture 168 and a valve seating 170 with a sealing ring 172 bounding said outlet aperture 168. A sealing-portion 176 at a top portion of the float 166 is configured for sealing engagement against the sealing ring 172, when the float 166 is urged upwards under buoyancy forces acting thereon at the event (not shown) of liquid filling the housing 152, thus closing outlet aperture 168. When, however, gas enters the housing 152, the float member 166 descends and opens the outlet aperture 168.

As can further be seen in the drawings, the valve 150 is configured at a top portion thereof, with a sealing-member opening mechanism generally designated 180. The sealing-member opening mechanism 55 is configured in turn with a plunger 182 extending from the sealing-member opening mechanism 180. It is however appreciated that the opening mechanism 180 can be any type of such mechanism, such as a solenoid, a hydraulic/pneumatic activator, a piston type activator, a magnetic displacing mechanism, a step motor and the like, mutatis mutandis, and however configured for manipulating the plunger 182 to apply force over the closed float member 166 and thus displace it from its closed, sealing position, to an open position disengaged from the sealing valve seating 170.

The sealing-member displacing mechanism 180 is normally at its retracted position, whereby the plunger 182 is retracted, i.e. disposed so as not interfering with sealing of the outlet port. However, upon initiating the sealing-member displacing mechanism 180, e.g. by an electric signal or a hydraulic/pneumatic pulse (depending on the nature of the sealing-member displacing mechanism 180, the plunger 182 momentarily projects so as to rapidly displace the float 166 into its open position, to thereby discharge pressure from the valve 150.

The invention claimed is:

1. A fluid flow valve, comprising:
a housing comprising a fluid inlet port, and a fluid outlet port comprising an outlet aperture and a valve seating forming a boundary of said outlet aperture;
a sealing-member configured to be biased, under fluid pressure within the housing, against the valve seating so as to seal the outlet aperture;
a sealing-member displacing mechanism secured to the sealing-member so that displacement of the displacing mechanism in a first direction detaches the sealing-member from the valve seating so as to open the outlet aperture, while displacement of the displacing mechanism in an opposite direction allows for the sealing-member to become sealingly biased against the valve seating; and
a sealing-member opening mechanism operable with an activating unit for selectively manipulating the sealing-member opening mechanism between the open and the closed positions, said activating unit comprises a pilot valve configured for generating an operating signal responsive to a predetermined pressure-threshold at the fluid inlet port, said operating signal being configured to be transferred for operating the sealing-member opening mechanism so as to displace the sealing-member.

2. The fluid flow valve according to claim 1, wherein the sealing member is manipulable by the sealing-member opening mechanism between an open position in which the sealing-member is detached from the valve seating and a closed position in which the sealing-member is sealingly biased against the valve seating.

3. The fluid flow valve according to claim 2, wherein the sealing member opening mechanism is configured to manipulate the sealing-member into the open position for substantially short periods of time.

4. The fluid flow valve according to claim 1, wherein the sealing-member opening mechanism is configured as an add-on unit applied to the fluid valve.

5. The fluid flow valve according to claim 1, wherein the sealing-member opening mechanism comprises a plunger.

6. The fluid flow valve according to claim 1, wherein the sealing member opening mechanism is configured to manipulate the sealing-member into an open or a closed position, such that to eliminate or substantially reduce shockwaves in a fluid system to which the fluid flow valve is articulated.

7. The fluid flow valve according to claim 1, wherein the sealing-member displacing mechanism comprises a float member.

8. The fluid flow valve according to claim 1, wherein the sealing-member is pivotally articulated to the housing.

9. The fluid flow valve according to claim 1, wherein the sealing-member is a flexible sealing-membrane.

10. The fluid flow valve according to claim 1, further comprising a pump disposed within the fluid line of the fluid flow valve and a wired or a wireless transmission unit in communication with sealing-member opening mechanism, configured, upon activation or shutdown of the pump to operate the sealing-member opening mechanism, thereby reducing or eliminating a shockwave that is generated by said activation or shutdown of the pump.

11. A fluid flow system, comprising:
(a) a fluid flow valve comprising: a housing comprising a fluid inlet port, and a fluid outlet port comprising an outlet aperture and a valve seating forming a boundary of said outlet aperture, a sealing-member configured to be biased, under fluid pressure within the housing, against the valve seating so as to seal the outlet aperture, a sealing-member displacing mechanism secured to the sealing-member so that displacement of the displacing mechanism in a first direction detaches the sealing-member from the valve seating so as to open the outlet aperture, while displacement of the displacing mechanism in an opposite direction allows for the sealing-member to become sealingly biased against the valve seating, and a sealing-member opening mechanism configured for displacing said sealing member against the biasing effect of the displacing mechanism so as to discharge the fluid flow valve; and
(b) an activating unit comprising a pilot valve configured for generating an operating signal responsive to a predetermined pressure-threshold at the fluid inlet port, said operating signal being configured to be transferred for operating the sealing-member opening mechanism so as to displace the sealing-member.

12. The fluid flow system according to claim 11, wherein the pilot valve is in flow communication with the sealing-member opening mechanism.

13. The fluid flow system according to claim 12, wherein the flow communication between the pilot valve and the sealing-member opening mechanism is constituted by a hydraulic command line, and the operating signal generated by the pilot valve is an activating hydraulic signal transferred via said hydraulic command line.

14. The fluid flow system according to claim 11, wherein the sealing member opening mechanism comprises a hydraulic piston and a plunger, said hydraulic piston being configured for urging the plunger against the sealing-member for displacing the sealing member to its open position.

15. The fluid flow system according to claim 11, further comprising a pump disposed within the fluid line of the fluid flow valve and a wired or a wireless transmission unit in communication with sealing-member opening mechanism, configured, upon activation or shutdown of the pump to operate the sealing-member opening mechanism, thereby reducing or eliminating a shock wave that is generated by said activation or shutdown of the pump.

* * * * *